(12) United States Patent
Watanabe et al.

(10) Patent No.: US 7,084,900 B1
(45) Date of Patent: Aug. 1, 2006

(54) IMAGE PROCESSING APPARATUS

(75) Inventors: Atsushi Watanabe, Tokyo (JP); Taro Arimatsu, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/546,214

(22) Filed: Apr. 10, 2000

(30) Foreign Application Priority Data

Apr. 8, 1999 (JP) ................................. 11-101885

(51) Int. Cl.
*H04N 7/18* (2006.01)
*H04N 9/47* (2006.01)

(52) U.S. Cl. .......................... 348/94; 348/95; 382/151
(58) Field of Classification Search ................ 382/152, 382/156, 159, 216, 141, 151; 348/86, 91, 348/94, 95, 129, 130
See application file for complete search history.

(56) References Cited

U.S. PATENT DOCUMENTS

| | | | | |
|---|---|---|---|---|
| 4,680,802 | A * | 7/1987 | Nishida et al. | 382/141 |
| 4,985,846 | A * | 1/1991 | Fallon | 382/153 |
| 5,550,928 | A * | 8/1996 | Lu et al. | 382/116 |
| 5,559,727 | A * | 9/1996 | Deley et al. | 700/279 |
| 5,845,048 | A | 12/1998 | Masumoto | |
| 5,897,611 | A * | 4/1999 | Case et al. | 702/150 |
| 5,909,504 | A * | 6/1999 | Whitman | 382/141 |
| 6,026,189 | A * | 2/2000 | Greenspan | 382/226 |
| 6,266,442 | B1 * | 7/2001 | Laumeyer et al. | 382/190 |
| 6,424,745 | B1 * | 7/2002 | Hansen et al. | 382/191 |
| 6,437,784 | B1 * | 8/2002 | Bentley et al. | 345/473 |
| 6,445,814 | B1 * | 9/2002 | Iijima et al. | 382/154 |

FOREIGN PATENT DOCUMENTS

GB 2 085 629 4/1982

OTHER PUBLICATIONS

Ichiro Masaki, "Industrial Vision Systems Based on Application-Specific IC Chips", IEICE Transactions, Institute of Electronics, vol. E74 No. 6, Jun. 1, 1991, pp. 1728-1734.
Michael Magee et al, "An Industrial Model Based Computer Vision System", Journal of Manufacturing Systems, Society of Manufacturing Engineers, vol. 14 No. 3, 1995, pp. 169-186.

(Continued)

*Primary Examiner*—Vu Le
(74) *Attorney, Agent, or Firm*—Staas & Halsey LLP

(57) ABSTRACT

An image processing apparatus capable of detecting position and posture of individual workpieces randomly arranged in a stack and having identical shapes. Reference models are created from two-dimensional images of a reference workpeace captured in a plurality of directions by a camera and stored. Also, the relative positions/postures of the workpiece with respect to the camera at the respective image capturing are stored. An image of a stack of workpieces is captured by the camera to obtain a two-dimensional image and the position/posture of the camera at the image capturing is stored. An image of a workpiece matched with one reference model is selected by matching processing of the reference model with the captured image. A three-dimensional position/posture of the workpiece with respect to the camera is obtained from the image of the selected workpiece, the selected reference model and position/posture information associated with the reference model. A picking operation for picking out a respective workpiece from a randomly arranged stack can be performed by a robot based on the position/posture of the workpiece.

10 Claims, 7 Drawing Sheets

OTHER PUBLICATIONS

Sarah Wang et al, "Model-Based Vision for Robotic Manipulation of Twisted Tubular Parts: Using Affine Transforms and Heuristuic Search", Robotics and Automation, IEEE, May 8, 1994, pp. 208-215.

Kohtaro Ohba et al, "Recognition of the Multi Specularity Objects for Bin-picking Task", IEEE, Nov. 4, 1996, pp. 1440-1447.

Toshiyuki Amano et al, "Eignespace Approach for Object Recognition and Its Pose Detection", Systems and Computer in Japan, vol. 31 No. 11, Oct. 2000, pp. 60-69.

J. Hornegger et al, "Statistical Learning, Localization, and Identification of Objects", IEEE, Jun. 20, 1995, pp. 914-919.

Juan Andrade-Cetto et al., Object Recognition, "Wiley Encyclopedia of Electrical Engineering", Apr. 1, 2000, pp. 449-470.

* cited by examiner

IMAGE PROCESSING APPARATUS

BACKGROUND OF THE INVENTION

1. Field of the Invention

The present invention relates to an image processing apparatus for detecting three-dimensional position and posture (orientation) of an object, and in particular to an image processing apparatus suitable for use in a bin-picking operation for taking out a workpiece one by one from a stack of workpieces using an industrial machine such as a robot.

2. Description of Related Art

An operation of taking out an individual workpiece from a randomly arranged stack of workpieces or an aggregation of workpieces contained in a container of a predetermined size, which have identical shapes and different three-dimensional positions/postures, has been performed manually. In storing workpieces in a pallet or placing workpieces at a predetermined position in a machine or a device using a (dedicated) robot, since it has been impossible to directly take out an individual workpiece one by one from the randomly arranged stack of workpieces by the dedicated robot, it has been necessary to rearrange the workpieces in advance so as to be picked out by the robot. In this rearrangement operation, it has been necessary to take out an individual workpiece from the stack manually.

The reason why individual workpieces having identical shapes and different three-dimensional positions/postures can not be picked out by a robot from a randomly arranged stack of workpieces or an aggregation of workpieces contained in a container is that the position/posture of individual workpieces in the stack or the aggregation can not be recognized, so that a robot hand can not be placed to a suitable position/posture at which the robot hand can hold the individual workpiece.

SUMMARY OF THE INVENTION

An object of the present invention is to provide an image processing apparatus capable of detecting three-dimensional position and posture of individual objects in a randomly arranged stack or an aggregation in a container of a predetermined region, which have identical shapes and different three-dimensional positions/postures.

An image processing apparatus of the present invention includes an image capturing device; and a memory storing reference models created based on image data of a reference object captured by the image capturing device in a plurality of directions, and storing information of the capturing directions to be respectively associated with the reference models. The reference object may be an object of detection itself or an object having a shape identical to that of the object of detection.

The image processing apparatus also includes a processor to perform matching processing on image data containing an image of the object of detection captured by the image capturing device with the reference models to select an image of an object matched with one of the reference models, and to obtain posture, or posture and position of the object based on the selected image of the object, said one reference model and the information of the direction associated with said one reference model.

The reference models may be a part of the image data of the reference object or obtained by processing the image data of the reference object.

The image capturing device may be attached to a wrist of a robot. Further, the image data of the reference object can be captured in a place different from a place where the detection of the object is performed, and supplied to the image processing apparatus on line or off line.

The image capturing device may be attached to an wrist of an robot. Further, the image data of the reference object can be captured in a place different from a place where the detection of the object is performed, and supplied to the image processing apparatus on line or off line.

DETAILED DESCRIPTION OF THE PREFERRED EMBODIMENTS

Figure 1:
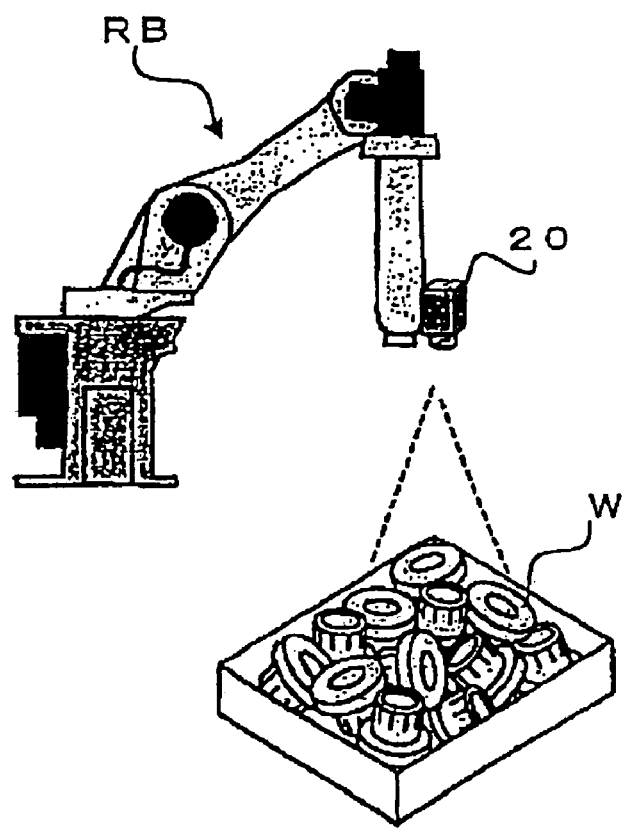
FIG. 1 is a diagram for showing a picking operation by a robot to take out an individual workpiece from a stack of workpieces using an image processing apparatus according to an embodiment of the present invention.

An embodiment in which an image processing apparatus of the present invention is used in combination with a robot system will be described. In this embodiment, an image of a stack of workpieces, which are objects of detection having identical shapes and randomly arranged as shown in FIG. 1, is captured by an image capturing device (camera or visual sensor) 20, which is attached to a wrist of a robot RB and position and posture (orientation) of the individual workpieces are detected based on the captured image. For this purpose, images of a reference object, which is one of workpieces W subjected to a picking operation or an object having a shape identical to that of the workpiece W are captured in different directions by the image capturing device and reference models are created from the image data obtained by the image capturing and stored in advance. Matching processing between the image data obtained by capturing the image of the stack of workpieces and the reference models is executed to select an image of one workpiece matched with one of the reference models, and a position/posture of the selected workpiece is determined based on the selected image of the workpiece in the image field of view, the selected one of taught modes and the position/posture information associated with the selected one of the reference models.

Figure 3:
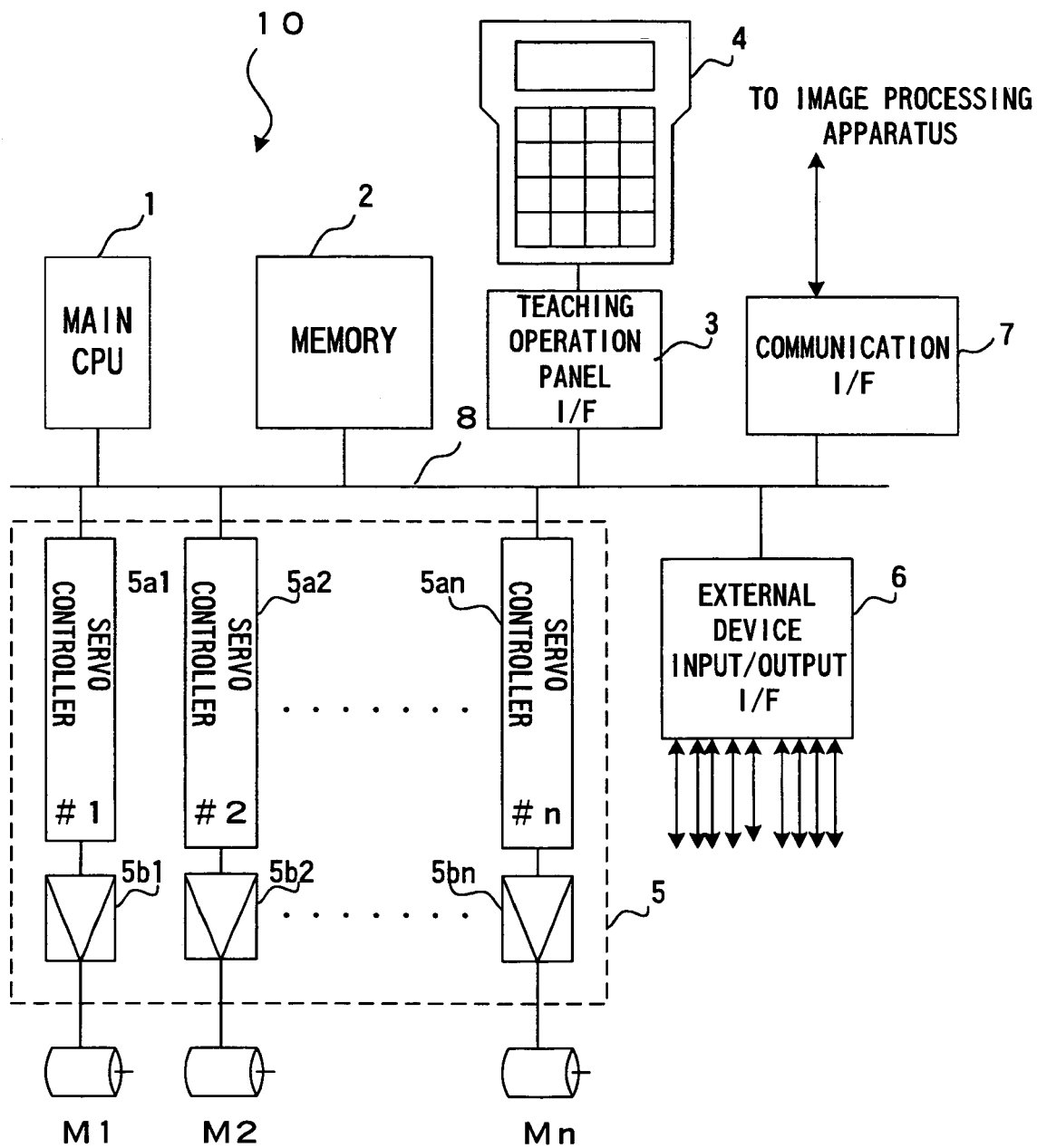
FIG. 3 is a block diagram of a principal part of a robot controller.

FIG. 3 is a block diagram showing a principal part of a robot controller 10 for use in the embodiment of the present invention. A main processor 1, a memory, 2 including a RAM, a ROM and a nonvolatile memory (such as an EEPROM), an interface 3 for a teaching operating panel, an interface 6 for external devices, an interface 7 for an image processing apparatus and a servo control section 5 are connected to a bus 8. A teaching operating panel 4 is connected to the interface 3 for a teaching operating panel.

A system program for supporting basic functions of the robot RB and robot controller 10 are stored in the ROM of the memory 2. Robot operation programs and their related determined data which are taught in accordance with various operations are stored in the nonvolatile memory of the memory 2. The RAM of the memory 2 is used for temporarily storage of data for various arithmetic operations performed by the processor 1.

The servo control section 5 includes servo controllers 5a1 to 5an (n: sum of the number of all the axes of the robot including additional movable axes of a tool attached to a wrist of the robot), each composed of a processor, a ROM, a RAM, etc. Each servo controller performs position/velocity loop control and also current loop control for its associated servomotor for driving the axis, to function as a co-called digital servo controller for performing loop control of position, velocity and current by software. Each servomotor M1–Mn for driving each axis is drivingly controlled according to outputs of the associated servo controller 5a1–5an through the associated servo amplifier 5b1–5bn. Though not shown in FIG. 3, a position/velocity detector is attached to each servomotor M1–Mn, and the position and velocity of each servomotor detected by the associated position/velocity detector is fed back to the associated servo controller 5a1–5am. To the input-output interface 6 are connected sensors of the robot, and actuators and sensors of peripheral devices.

Figure 4:
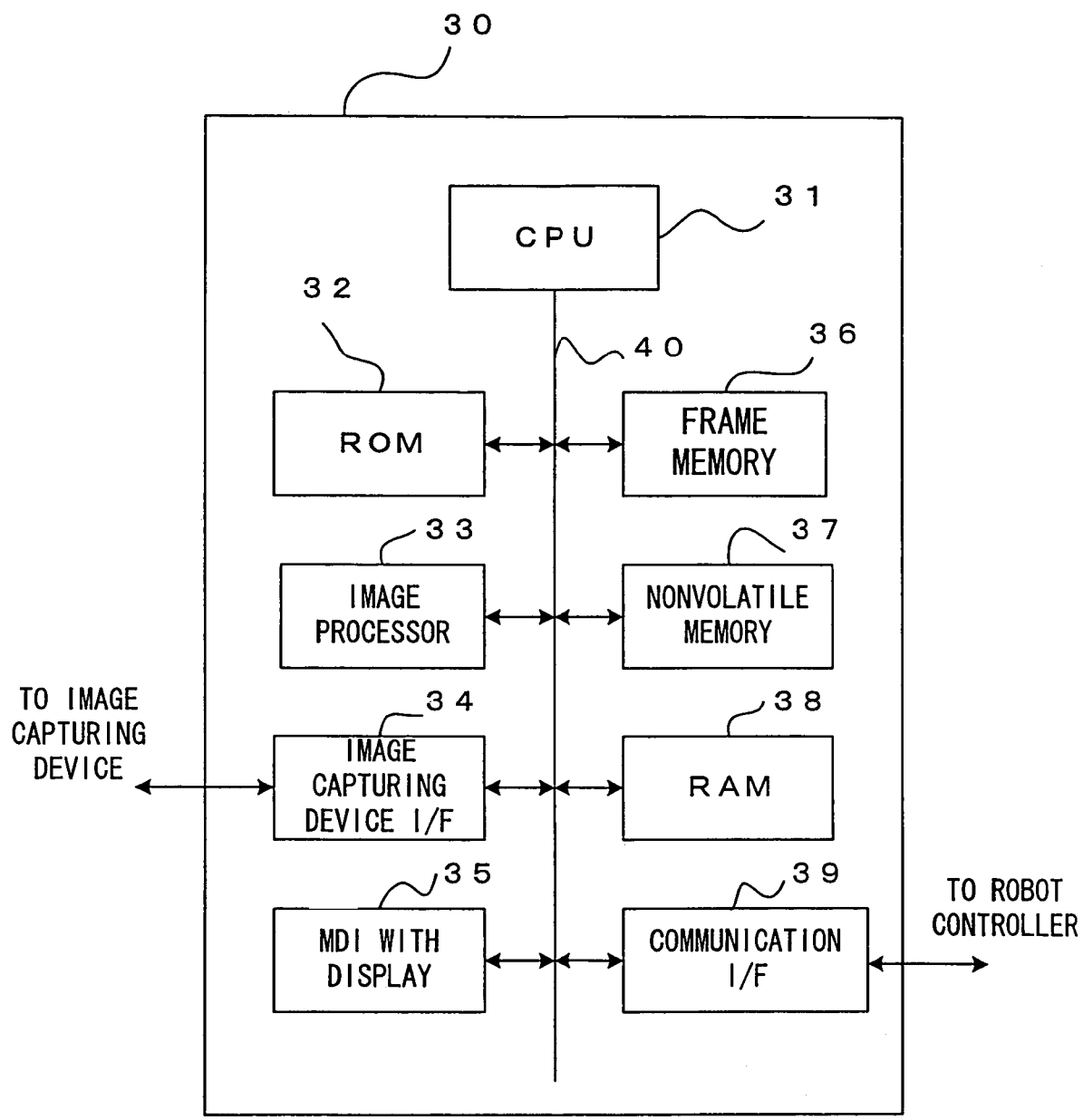
FIG. 4 is a block diagram of the image processing apparatus according to an embodiment of the present invention.

FIG. 4 is a block diagram of the image processing apparatus 30 connected to the interface 7 of the robot controller 10. The image processing apparatus 30 includes a processor 31 to which a ROM 32 for storing a system program to be executed by the processor 31, an image processor 33, an image-capturing-device interface 34 connected to the image capturing device 20, an MDI 35 with a display such as a CRT or a liquid crystal display for inputting and outputting various commands and data, a frame memory 36, a nonvolatile memory 37, a RAM 38 for temporary storage of data and a communication interface 39 for the robot controller are connected. An image captured by the camera 20 is stored in the frame memory 36. The image processor 33 performs image processing of images stored in the frame memory 36 on demand of the processor 31 so as to recognize an object. The architecture and function of the image processing apparatus 30 itself is no way different from the conventional image processing apparatus. The image processing apparatus 30 of the present invention is different from the conventional one in that reference models as described later are stored in the nonvolatile memory 37 and pattern matching processing is performed on an image of a stack of workpieces W captured by the image capturing device 20 using the reference models to obtain a position and posture of a workpiece W.

The image capturing device 20 is used for obtaining image data, as described later, and may be a CCD camera for obtaining two-dimensional images data or a visual sensor capable of obtaining three-dimensional image data including distance data. In the case of using the CCD camera, the image data is obtained by a conventional method based on two-dimensional images captured by the CCD camera, but in cases of the visual sensor capable of obtaining three-dimensional data including distance data, two-dimensional arrangement data with distance data between the sensor and an object is obtained. The visual sensor for obtaining the three-dimensional data including distance data is known, for example, from a three-dimensional visual sensor of a spot light scanning type disclosed in Japanese Patent Publication No. 7-270137, and the summary to the three-dimensional visual sensor is described below.

This visual sensor detects a three-dimensional position of an object by irradiating a light beam to form a light spot on the object for scanning the object in two different directions (X direction and Y direction) and by detecting the light reflected on the object by a position sensitive detector (PSD). Three dimensional position of the object is measured by a calculation using the respective inclination angles θx, θy of mirrors for scanning and incident positions of the reflected light beam on the PSD.

Figures 7, 8:
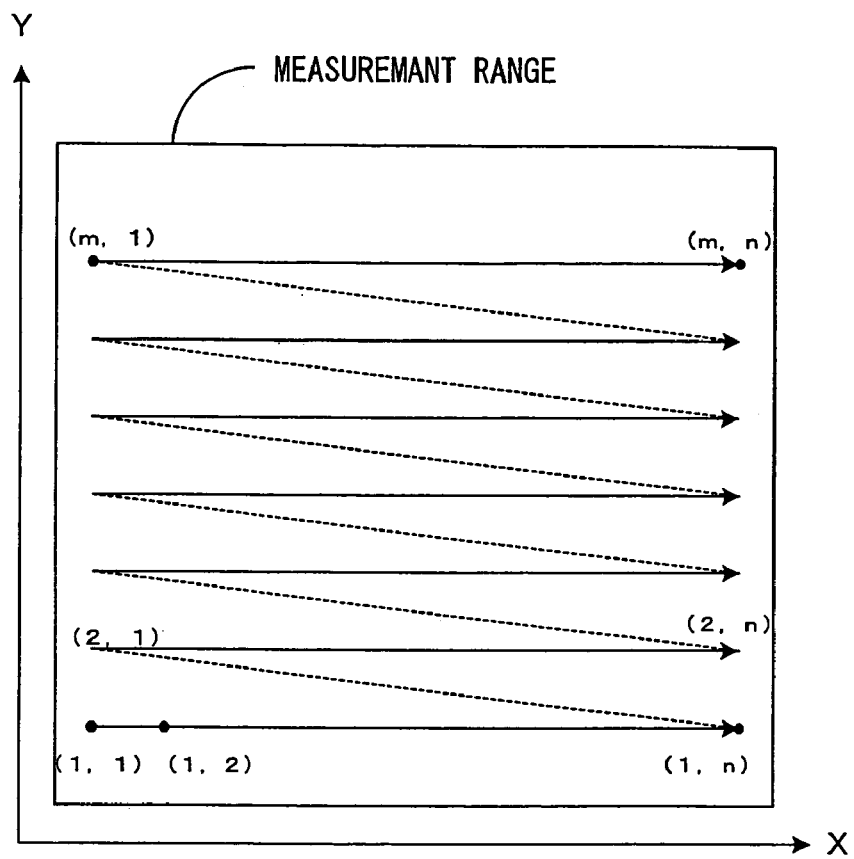
FIG. 7 is a diagram showing an example of scanning motion of a visual sensor capable of obtaining distance data.
FIG. 8 is a diagram of the two-dimensional arrangement data containing distance data as image data obtained by the visual sensor.
Figure 9:
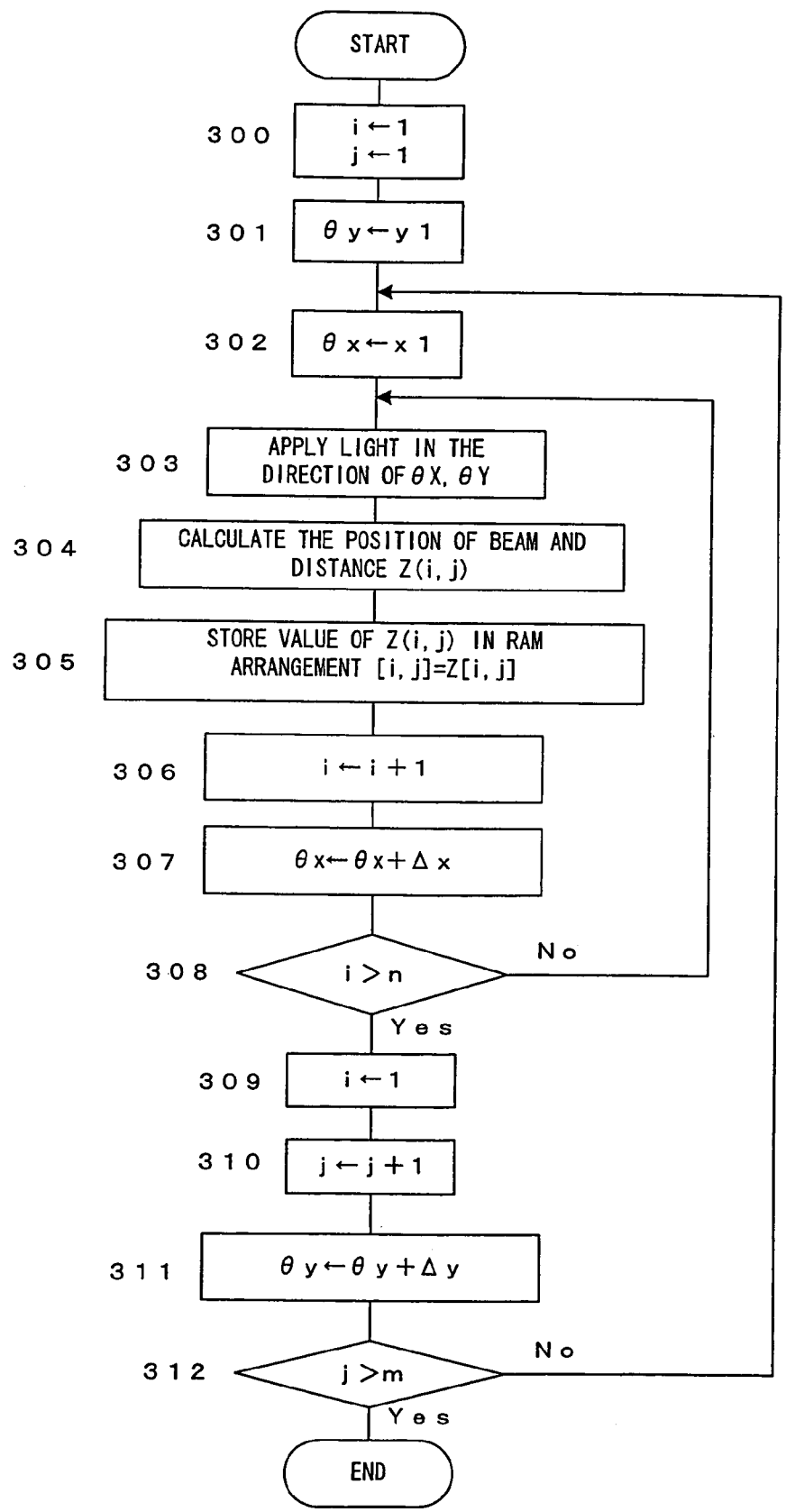
FIG. 9 is a flowchart of processing for obtaining the two-dimensional arrangement data.

Referring to FIGS. 7–9, a method of obtaining two-dimensional arrangement data including distance data using the three-dimensional visual sensor will be explained briefly.

Scanning range (measuring range) on an object is set in advance, and an inclination angle θx, θy of the mirrors is controlled discretely. As shown in FIG. 7, the scanning is performed from a point (1, 1) to a point (1, n), from a point (2, 1) to a point (2, n), . . . , from a point (m, 1) to a point (m, n) on the X-Y plane within the scanning range, to measure three-dimensional positions of each reflected point on the object. Also, a distance Z (i, j) between the sensor and the reflection point (i, j) on the object is obtained and stored in the RAM 38 of the image processing apparatus 30. Thus, the image data is obtained as two dimensional arrangement data including the distance data Z (i, j) between the sensor and the reflection point on the object, as shown in FIG. 8.

FIG. 9 is a flowchart of processing to be executed by the processor 31 of the image processing apparatus 30 for obtaining the image data.

First, indexes i and j are respectively set to "1" (Step 300) and the inclination angle (θx, θy) of the mirrors is set to (x1, y1) to direct to the start point (1, 1) and an irradiation command with the inclination angle is send to the sensor 20 (Steps 301–303). The sensor irradiates a light beam with the mirrors set at the inclination angle. The signal representing the image captured by the PSD is sent to the image processing apparatus 30. The processor 31 of the image processing apparatus 30 calculates the position of the reflection point on the object from the signal from the PSD and the inclination angle (θx, θy) of the mirrors to obtain the distance Z (i, j) between the sensor and the position of the reflection point on the object. This value Z (i, j) is stored in the RAM 38 as the two-dimensional arrangement data [i, j] (Step 304, 305). The calculation for obtaining the position of the reflection point and the distance Z (i, j) may be performed by the sensor 20.

Then the index i is incrementally increased by "1" and the inclination angle θx of the mirror for X-axis direction scanning is increased by the predetermined amount Δx (Step 306, 307). It is determined whether or not the index i exceeds the set value n (Step 308). If the index i does not exceed the set value n, the procedure returns to Step 303 and the processing from Step 303 to Step 308 is executed to obtain the distance Z (i, j) of the next point. Subsequently, the processing of Steps 303–308 is reportedly executed until the index i exceeds the set value n to obtain and store the distance Z (i, j) of the respective points (1, 1) to (1, n) shown in FIG. 7.

If it is determined that the index i exceeds the set value n in Step 308, the index i is set to "1" and the index j is incrementally increased by "1" to increase the inclination angle θy of the mirror for Y-axis direction scanning (Steps 309–311). Then, it is determined whether or not the index j exceeds the set value m (Step 312) and if the index j does not exceed the set value m, the procedure returns to Step 302 to repeatedly execute the processing of Step 302 and the subsequent Steps.

Thus, the processing from Step 302 to Step 312 is repeatedly executed until the index j exceeds the set value m. If the index j exceeds the set value m, the points in the measurement range (scanning range) shown in FIG. 7 have been measured entirely, the distance data Z (1, 1)–Z (m, n) as two-dimensional arrangement data are stored in the RAM 28 and the image data obtaining processing is terminated. A part of the image data of two-dimensional arrangements or a plurality of distance data can be obtained by appropriately omitting the measurement of the distance for the index i.

The foregoing is a description on the processing for obtaining two-dimensional arrangement data as image data using the visual sensor capable of measuring the distance. Using the two-dimensional arrangement data obtained in this way as image data, creation of reference models and detection of position and posture (orientation) of an object can be performed. In order to simplify the explanation, the following description will be made assuming that a CCD camera 20 is used as an image capturing device and the two-dimensional image data obtained by capturing image of the object by this camera 20 is used.

Figure 5:
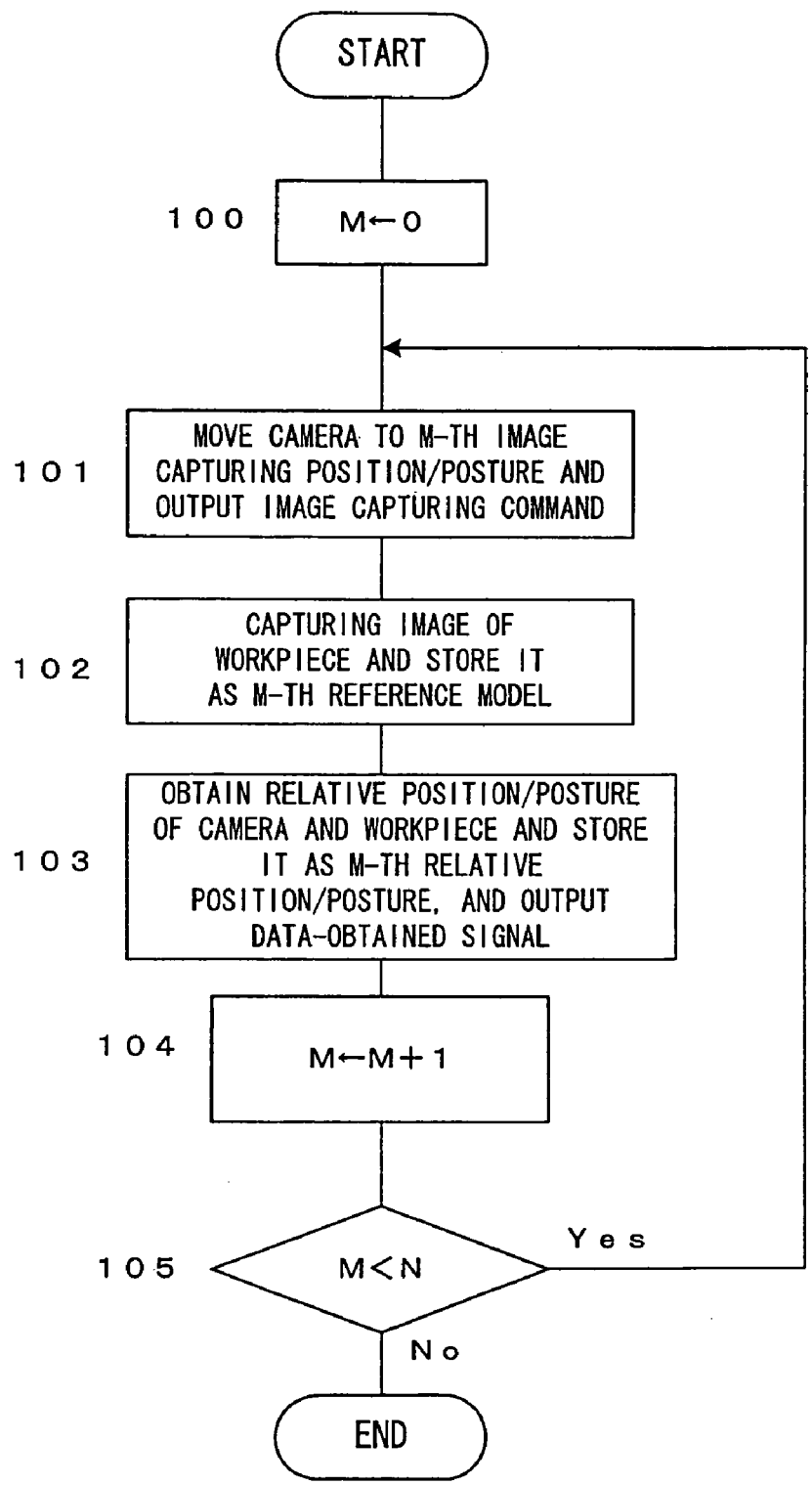
FIG. 5 is a flowchart of the processing for creating reference models.

Processing for creating reference models will be explained referring to FIGS. 2a–2d and FIG. 5. FIG. 5 is a flowchart showing processing for teaching reference models to the image processing apparatus 30 according to the present invention.

One reference workpiece (one of the worpieces W as objects of robot operation or a workpiece having a three-dimensional shape identical to that of the workpiece W) is prepared for creating reference models. A first (0-th) position/posture of the reference workpiece at which the camera 20 attached to a distal end of a robot wrist captures the image of the object is set, and an axis of rotation and rotation angles with respect to the first (0-th) position/posture are set in order to determine the subsequent positions/postures of the reference workpiece. In addition, the number of the positions/postures of the workpiece at which the camera 20 captures the image of the object are set. In this example, information of both position and posture is used, however it is sufficient for creating reference models using only posture (orientation) information if a demanded precision of position is not high.

Figure 2A:
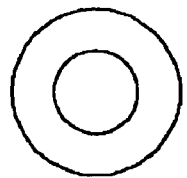
FIGS. 2a–2d show examples of reference models.

As shown in FIGS. 2a to 2d, in this example, images of the reference workpiece are captured from four different directions and reference models are created based on the four image data. As shown in FIG. 2a, an image of the reference workpiece is captured from the direction of a Z-axis of a world coordinate system at 0-th position/posture to create 0-th reference model. For setting the subsequent positions/postures, an axis perpendicular to an optical axis of the camera and passing a central point of the workpiece (an origin of a work coordinate system set to the workpiece) and rotation angles of the workpiece along the rotation axis are set for this camera position. Since the optical axis of the camera is set parallel to the Z axis of the world coordinate system, an axis parallel to either the X-axis or the Y-axis of the world coordinate system, which is perpendicular to the Z axis, can be selected and the workpiece is rotated around the rotation axis at the workpiece position.

Figure 2B:
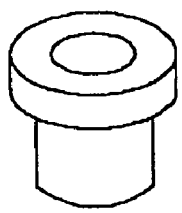
Figure 2C:
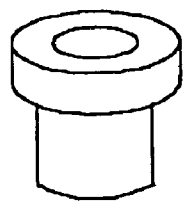
Figure 2D:
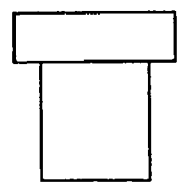

In the example, an axis parallel to the X-axis of the world coordinate system is set as the rotation axis, and for the position/posture shown in FIG. 2b, the rotation angle of 30° is set to rotate the workpiece by 30° with respect to the camera along the rotation axis. 1$^{st}$ reference model is created based on the image data of the workpiece at the position/posture shown in FIG. 2b. Similarly, as shown in FIGS. 2c and 2d, the workpiece is rotated by 60° and 90°, respectively, along the rotation axis for capturing images of the workpiece to create 2nd and 3rd reference models.

In this example, rotation angles of zero degree, 30 degrees, 60 degrees and 90 degrees are set for creating four reference models. The dividing range of the rotation angles may be set more finely and/or range of the rotation angle may be set greater to create more reference models for more precise detection of the position/posture of the workpiece.

Processing of creating the four reference models will be explained referring to flowchart of FIG. 5.

As described above, the 0-th position/posture of the robot at which the camera 20 captures the image of the object, and the rotation axis and the rotation angels with respect to the 0-th position/posture are set in advance in order to determine the subsequent positions/postures of the reference workpiece, and also the number of the subsequent positions/postures of the workpiece are set. For intelligible explanation, it is assumed that an optical axis of the camera is parallel to the Y-axis of the world coordinate system and that a position where the X-axis and Y-axis coordinate values are identical to those of the reference workpiece and only the Z-axis coordinate value is different from that of the position of the reference workpiece is taught to the robot as the 0-th image capturing position for obtaining the 0-th reference model. Further, the positions of the robot where the camera is rotated with respect to the reference workpiece by 30 degrees, 60 degrees and 90 degrees along the axis passing the central point of the reference workpiece and parallel to the X-axis of the world coordinate system are set as the 1st, 2nd and 3rd image capturing position, and the number N of the image capturing positions is set "4."

When a command of creating reference models is inputted from teaching operation panel 4, the processor 1 of the robot controller 10 sets a counter M for counting the number of the image capturing to "0" (Step 100). The robot is operated to have the M-th position/posture and a command for image capturing is outputted to the image processing apparatus 30 (Step 101). In response to this command, the image processing apparatus 30 performs capturing of an image of the reference workpiece with the camera 20 and the captured image data is stored in the frame memory 36 (Step 102). Further, relative position/posture of the workpiece with respect to the camera is obtained and stored in the nonvolatile memory 37 as relative position/posture of M-th reference model, and a data-captured signal is sent to a robot controller (Step 103). Thus, position/posture of the workpiece is a camera coordinate system set to the camera is obtained from the position/posture of the camera and the position/posture of the reference workpiece in the world coordinate system when capturing the image by the camera, and is stored as the relative position/posture of the workpiece with respect to the camera. For example, the position/posture of the workpiece in the camera coordinate system is stored as [x0, y0, z0, α0, β0, γ0]c, where α, β and γ mean rotation angle around X-, Y-. Z- axes, and "c" means the camera coordinate system.

Upon receipt of the data-captured signal, the processor 1 of the robot controller 10 incrementally increases the value of the counter M by "1" (Step 104) and determines whether or not the value of the counter M is less than a set value N (=4) (Step 105). If the value of the counter M is less than the set value N, the procedure returns to Step 101 to move the robot to the M-th image-capturing position/posture. Thus, in the example as shown in FIGS. 2a–2d, the camera is successively turned by 30 degrees around the axis parallel to X axis of the world coordinate system and passing the workpiece position, and successively captures the image of the workpiece, and reference models and relativity positions/postures of the camera with respect to the workpiece at the image capturing are stored.

Processing of Steps 101–105 is repeatedly executed until the value of the counter M equals the set value N (=4), and the reference models and the relative positions/postures of the camera and the workpiece are stored in the nonvolatile memory 37. Thus, the reference models created from the image data of the workpiece at the positions/postures shown in FIGS. 2a–2d are stored, and the relative positions/postures between the camera and the workpiece for respective reference models are stored as positions/postures of the workpiece W in the camera coordinate systems as [x0, y0, z0, α0, β0, γ0]c, [x1, y1, z1, α1, β1, γ1]c, [x2, y2, z2, α2, β2, γ2]c, and [x3, y3, z3, α3, β3, γ3]c.

The reference models and the relative position/posture of the workpiece W and the camera 20 are stored in the nonvolatile memory 37 of the image processing apparatus 30. In the above described embodiment, the reference models are created using a robot, however, the reference models may be created by a manual operation without using a robot. In this case, the reference workpiece is arranged within a field of view of the camera connected to the image processing apparatus 30, and the images of the workpiece with different postures are captured by the camera. The reference models are created based on the image data and the relative positions/postures of the camera and the workpiece at the image capturing manually inputted, and are stored with the respective relative positions/postures.

The reference models may be created from a part of the image data of the reference object, and may be created by processing the image data of the reference object.

In addition, the reference models may be created based on the stored image data of the reference workpiece when detecting the position/posture of the objective workpiece, without creating and storing the reference models in advance.

Hereinafter, a picking operation for taking out an individual workpiece by a robot from a stack of workpieces each having a shape identical to that of the reference workpiece will be described, as an example of a method of detecting three-dimensional position/posture of an object, using the image processing apparatus 30 storing the reference models.

Figure 6:
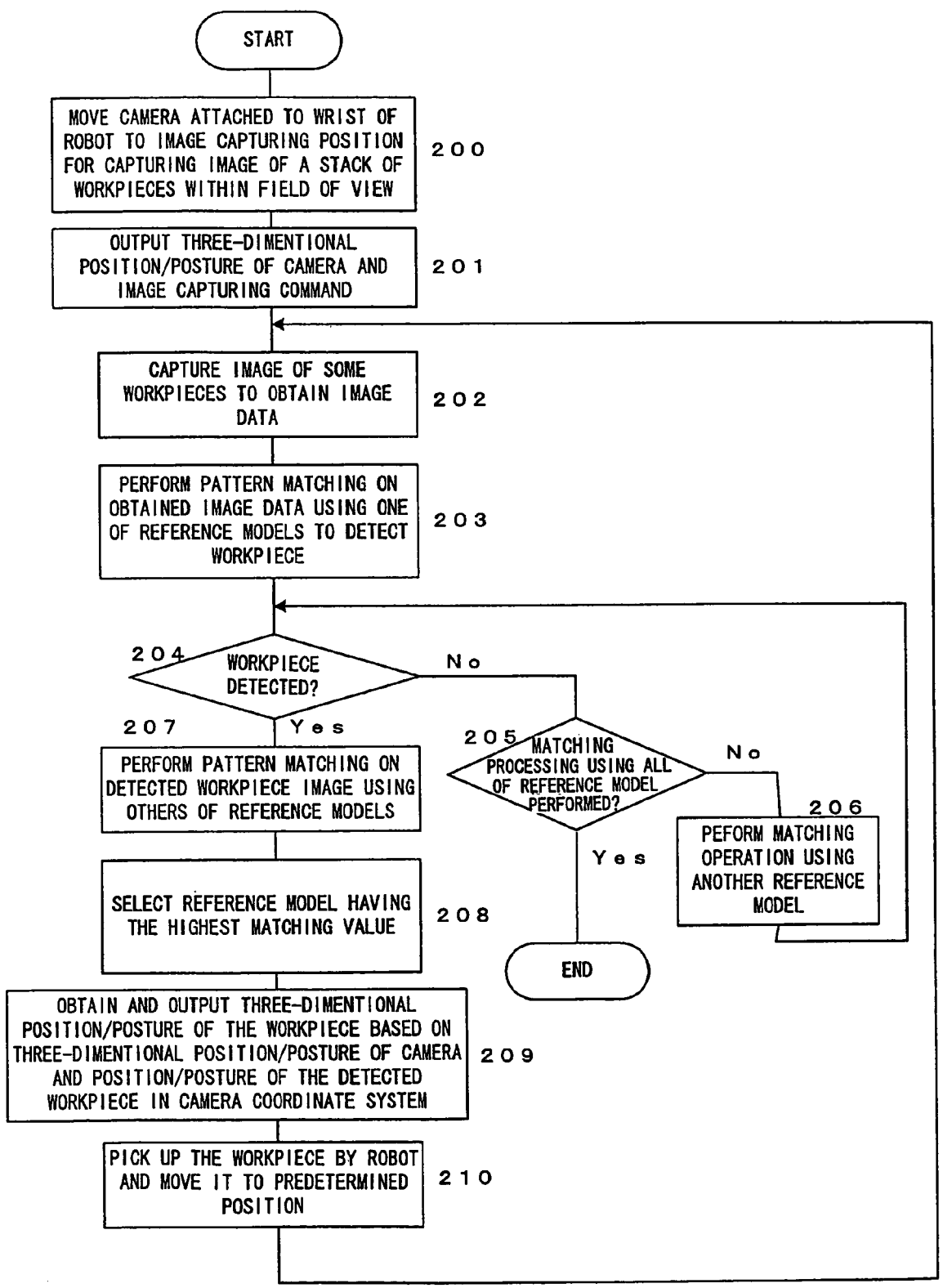
FIG. 6 is a flowchart of the processing for the picking operation.

FIG. 6 is a flowchart of processing for the picking operation. When a picking command is inputted into the robot controller 10 from the teaching operation panel 4, the processor 1 operates the robot RB to move the camera attached to the robot wrist to an image capturing position where a stack of workpieces is within a field of view of the camera 20 (Step 200). There-dimensional position/posture of the camera 20 on the world coordinate system at this image capturing position is outputted to the image processing apparatus 30, and a image capturing command is outputted (Step 201). Upon receipt of the image capturing command, the processor 31 of the image processing apparatus 30 captures an image of the stack of the workpieces W, to obtain image data of some workpieces W and store it in the frame memory 36 (Step 202).

Then, pattern matching processing is performed for the image data stored in the frame memory 36 using one of reference models (1st reference model) stored in the nonvolatile memory 37 so as to detect a workpiece W (Step 203). In this pattern matching processing, matching of the image data of the reference model with the image data of workpieces is performed on the basis of position, turn and scale. It is determined whether or not an object has a matching value equal or greater than the set value (Step 204). If an object having a matching value equal or greater than the set value is not detected, the procedure proceeds to Step 205 to determine whether or not the pattern matching is performed using all the reference models (1st to 4th reference models). If the pattern matching using all of the reference models is not yet performed, further pattern matching is performed using another reference model (Step 206).

If it is determined in Step 204 that an object having a matching value equal or greater than the set value with respect to any of the reference models is detected, the procedure proceeds to Step 207 to perform matching processing on the two-dimensional data of the detected workpieces W, using every taught mode. In Step 208, the reference model having the highest matching value in the pattern matching processing is selected, and the relative position/posture of the workpiece W with respect to the camera 20 is determined based on the relative position/posture of the camera and the reference workpiece stored for the selected reference model, and position, rotation angle and scale of the image of the workpiece in the matching processing, (Step 208). The position and posture (orientation) of the detected workpiece on the world coordinate system is determined from the position and posture of the camera 20 in the world coordinate system, which has been set in Step 201, and the relative position/posture of the workpiece W with respect to the camera 20, and is outputted (Step 209). Thus, since the relative position/posture of the workpiece W with respect to the camera 20 is the position/posture of the workpiece W in the camera coordinate system, the position and posture (orientation) of the detected workpiece W in the world coordinate system is obtained by an arithmetic operation of coordinate transformation using the data of the position/posture of the workpiece W in the camera coordinate system and the position/posture of the camera 20 in the world coordinate system (Step 209).

The reference model having the highest matching value is selected in this embodiment, however, a reference model of the rotation angle of zero degree (the 0-th reference model) may be selected with precedence, or an object having the highest expansion rate of scale (the object which is nearest to the camera, i.e. located at the summit of the stack in this example) may be selected with precedence.

The robot controller 10 operates the robot to perform a picking operation to grip and hold the detected workpiece W and move the held workpiece W to a predetermined position, based on the three-dimensional position/posture of the workpiece W (Step 210). Then, the procedure returns to Step 202 to repeatedly execute the processing of Step 202 and subsequent Steps.

When all the workpieces have been picked form the stack of the workpieces, matching value equal to or greater than the set reference value cannot be obtained in the pattern matching processing for all reference models in Steps 203–206, and the picking operation is terminated.

In the case where a stack of the workpieces can not fall within the field of view of the camera 20, or in the case where it is not necessary to capture an image of a workpiece behind other workpieces by changing the orientation of the camera, the procedure may return to Step 200 when it is determined "Yes" in Step 205, to move the camera to another position/posture at which an image of the objective workpiece can be captured.

In addition, in the case where the robot and the image processing apparatus 30 are used in combination as in the foregoing embodiment, the robot controller 10 may store the three-dimensional position/posture of the camera without outputting it to the image processing apparatus 30 in Step 201 and the relative position/posture of the workpiece and the camera may be outputted from the image processing apparatus 30 to the robot controller 10 in Step 208 to execute the processing of Step 209 in the robot controller 10.

Further, in the case where a wide-angle lens is installed in the CCD camera as the image capturing device, for example, there is possibility of judging the inclination angle to be 30 degrees by influence of parallax when a workpiece of zero degree inclination is at a corner of a field of view of the camera. In such a case, the camera may be moved parallel in accordance with the position of the workpiece in the field of view of the camera to a position right above the workpiece to lose influence of parallax, and at this position the image capturing processing of Step 201 and the subsequent Steps in FIG. 6 are performed so that the false judgment is prevented.

Furthermore, in order to obtain three-dimensional position/posture of an objective workpiece whose three-dimensional position/posture is unknown without using a robot, the camera is arranged to capture an image of a stack of workpieces or a region containing the objective workpiece within a field of view of the camera, and the position/posture of the camera in the world coordinate system is inputted to the image processing apparatus 30 and issuing an object detection command to the image processing apparatus 30, to make the image processing apparatus 30 execute Steps 202–209 of FIG. 6.

The image data for creating the reference models may be obtained at a place different form the place where the robot is installed. In this case, the image data may be supplied to the image processing apparatus on line through a communication interface provided in the image processing apparatus, or may be supplied off line through a disc driver for reading a floppy disk, etc.

According to the present invention, a position/posture of an objective workpiece in a randomly arranged stack of workpieces or an aggregation of workpieces gathered in a predetermined region which have identical shapes and different three-dimensional positions/postures is detected, to thereby enable a robot to automatically pick out an individual workpiece from such a stack or an aggregation.

What is claimed is:

1. An image processing apparatus for detecting posture, or posture and position of a three-dimensional object, comprising:
   a plurality of stacked objects, each having identical three-dimensional shapes but different positions and postures an image capturing device;
   a memory storing a plurality of reference models created based on image data of a reference object captured by said image capturing device in a plurality of angular rotation directions, and storing information of the angular rotation directions respectively associated with said reference models, said reference object being an object of detection or an object having a shape identical to that of the object of detection;
   a processor to perform matching processing on image data containing an image of the object of detection captured by said image capturing device against said plurality of stored reference models and select an image of an object matched with one of said reference models, and to obtain posture, or posture and position of the object based on the selected image of the object, said one of said reference models and the information of said respective angular rotation directions associated with said one reference model.

2. An image processing apparatus according to claim 1, wherein said reference models comprise a part of the image data of the reference object.

3. An image processing apparatus according to claim 1, wherein said reference models are obtained by processing the image data of the reference object.

4. An image processing apparatus according to claim 1, wherein said image capturing device comprises a camera for capturing two-dimensional image data.

5. An image processing apparatus according to claim 4, wherein said image data of the reference object are captured by said image capturing device from a predetermined distance.

6. An image processing apparatus according to claim 1, wherein said image capturing device comprises a visual sensor for capturing three-dimensional image data.

7. An image processing apparatus according to claim 6, wherein said image data containing an image of the object of detection captured by said visual senor is two-dimensional arrangement data including distance information from the object of detection to the image capturing device, a part of said two-dimensional arrangement data or a set of distance data.

8. An image processing apparatus according to claim 1, wherein said image capturing device is attached to a robot.

9. An image processing apparatus according to claim 1, wherein said image data of the reference object are captured in a place different from a place where the detection of the object is performed, and supplied to the image processing apparatus on line or off line.

10. An image processing apparatus connected to a robot for detecting a three-dimensional object-of-interest and directing a robot to pick one of the objects-of-interest from a plurality of objects-of-interest, comprising:
    an image capturing device operatively connected to the robot;
    a memory operatively connected to the image capturing device and the robot;
    a processor operatively connected to the memory and the robot;
    wherein the image capturing device captures a single three-dimensional reference object in a plurality of angular rotation orientations relative to a pre-set rotation axis, each captured object representing a respective reference model, and forwards position and posture information to define each reference model to the memory,
    wherein the memory stores the information regarding each reference model; and
    a plurality of objects-of-interest, one of which may be the reference object, each having a shape identical to the reference object, but each having a different position and posture from the remainder of the plurality of objects-of-interest,
    wherein said image capturing device captures an image of one of the plurality of objects-of-interest and forwards position and posture information regarding the object-of-interest to the processor,
    wherein the processor performs matching processing between the stored reference models and the position and posture of the captured image of the object-of-interest, and selects one of the reference models whose position and posture corresponds closest to the position and posture of said object-of-interest and instructs the robot to pick the captured object-of-interest from the plurality of objects-of-interest based on the stored information for the selected reference model.

* * * * *

UNITED STATES PATENT AND TRADEMARK OFFICE
CERTIFICATE OF CORRECTION

PATENT NO. : 7,084,900 B1
APPLICATION NO. : 09/546214
DATED : August 1, 2006
INVENTOR(S) : Atsushi Watanabe et al.

It is certified that error appears in the above-identified patent and that said Letters Patent is hereby corrected as shown below:

First Page Column 2 (Other Publications), Line 4, change "et al," to --et al.,--.
First Page Column 2 (Abstract), Line 4-5, change "workpeace" to --workpiece--.
Page 2 Column 1 (Other Publications), Line 1, change "et al," to --et al.,--.
Page 2 Column 1 (Other Publications), Line 3, change "Heuristuic" to --Heuristic--.
Page 1 Column 1 (Other Publications), Line 5, change "et al," to --et al.,--.
Page 1 Column 2 (Other Publications), Line 1, change "et al," to --et al.,--.
Page 2 Column 2 (Other Publications), Line 4, change "Hornegger" to --Homegger--.
Page 2 Column 2 (Other Publication), Line 4, change "et al," to --et al.,--.
Sheet 5 of 7 (Box 201) (FIG. 6), Line 1, change "THREE-DIMENTIONAL" to --THREE-DIMENSIONAL--.
Sheet 5 of 7 (Box 209) (FIG. 6), Line 3, change "THREE-DIMENTIONAL" to --THREE-DIMENSIONAL--.
Sheet 6 of 7 (Above Figure) (FIG. 7), Line 1, change "MEASUREMANT" to --MEASURMENT--.

Column 1, Line 66, insert --The image capturing device may be a camera for capturing two-dimensional image data, and in this case the image data of the reference object are captured by the image capturing device from a predetermined distance. Alternatively, the image capturing device may be a visual sensor for capturing three-dimensional image data, and when the three-dimensional visual sensor is adopted the image data containing an image of the object of detection may be two-dimensional arrangement data including distance information from the object of detection to the image capturing device, apart of said two-dimensional arrangement data or a set of distance data.--, as a new paragraph.

Column 2, Lines 4-8, delete "The image capturing device may be attached to an wrist of an robot. Further, the image data of the reference object can be captured in a place different from a place where the detection of the object is performed, and supplied to the image processing apparatus on line or off line."

Column 2, Line 63, change "memory," to --memory--.
Column 3, Line 18, change "co-called" to --so-called--.
Column 3, Line 22, change "5a1-5an" to --5a1-an--.
Column 3, Line 27, change "5al-5am." to -5a1-an.--.
Column 3, Line 27, change "input-output" to --input/output--.
Column 4, Line 9, change "Three dimensional" to --Three dimensional--.
Column 4, Line 27, change "two dimensional" to --two-dimensional--.
Column 4, Line 50, change "Then" to --Then,--.
Change 4, Line 58, change "reportedly" to --repeatedly--.

UNITED STATES PATENT AND TRADEMARK OFFICE
CERTIFICATE OF CORRECTION

PATENT NO. : 7,084,900 B1
APPLICATION NO. : 09/546214
DATED : August 1, 2006
INVENTOR(S) : Atsushi Watanabe et al.

It is certified that error appears in the above-identified patent and that said Letters Patent is hereby corrected as shown below:

Column 5, Line 30, change "worpieces" to --workpieces--.
Column 6, Line 16, change "angels" to --angles--.
Column 6, Line 50, after "piece" change "is" to --in--.
Column 6, Line 58, change "Y" to -- y-, --.
Column 7, Line 52, change "There-dimensional" to --Three-dimensional--.
Column 10, Line 16, change "senor" to --sensor--.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO.       : 7,084,900 B1
APPLICATION NO.  : 09/546214
DATED            : August 1, 2006
INVENTOR(S)      : Atsushi Watanabe et al.

It is certified that error appears in the above-identified patent and that said Letters Patent is hereby corrected as shown below:

First Page Column 2 (Other Publications), Line 4, change "et al," to --et al.,--.
First Page Column 2 (Abstract), Line 4-5, change "workpeace" to --workpiece--.
Page 2 Column 1 (Other Publications), Line 1, change "et al," to --et al.,--.
Page 2 Column 1 (Other Publications), Line 3, change "Heuristuic" to --Heuristic--.
Page 1 Column 1 (Other Publications), Line 5, change "et al," to --et al.,--.
Page 1 Column 2 (Other Publications), Line 1, change "et al," to --et al.,--.
Page 2 Column 2 (Other Publications), Line 4, change "Hornegger" to --Homegger--.
Page 2 Column 2 (Other Publication), Line 4, change "et al," to --et al.,--.
Sheet 5 of 7 (Box 201) (FIG. 6), Line 1, change "THREE-DIMENTIONAL" to --THREE-DIMENSIONAL--.
Sheet 5 of 7 (Box 209) (FIG. 6), Line 3, change "THREE-DIMENTIONAL" to --THREE-DIMENSIONAL--.
Sheet 6 of 7 (Above Figure) (FIG. 7), Line 1, change "MEASUREMANT" to --MEASURMENT--.

Column 1, Line 66, insert --The image capturing device may be a camera for capturing two-dimensional image data, and in this case the image data of the reference object are captured by the image capturing device from a predetermined distance. Alternatively, the image capturing device may be a visual sensor for capturing three-dimensional image data, and when the three-dimensional visual sensor is adopted the image data containing an image of the object of detection may be two-dimensional arrangement data including distance information from the object of detection to the image capturing device, apart of said two-dimensional arrangement data or a set of distance data.--, as a new paragraph.

Column 2, Lines 4-8, delete "The image capturing device may be attached to an wrist of an robot. Further, the image data of the reference object can be captured in a place different from a place where the detection of the object is performed, and supplied to the image processing apparatus on line or off line."

Column 2, Line 63, change "memory," to --memory--.
Column 3, Line 18, change "co-called" to --so-called--.
Column 3, Line 22, change "5a1-5an" to --5a1-an--.
Column 3, Line 27, change "5al-5am." to -5a1-an.--.
Column 3, Line 27, change "input-output" to --input/output--.
Column 4, Line 9, change "Three dimensional" to --Three-dimensional--.
Column 4, Line 27, change "two dimensional" to --two-dimensional--.
Column 4, Line 50, change "Then" to --Then,--.
Change 4, Line 58, change "reportedly" to --repeatedly--.

UNITED STATES PATENT AND TRADEMARK OFFICE
CERTIFICATE OF CORRECTION

PATENT NO. : 7,084,900 B1
APPLICATION NO. : 09/546214
DATED : August 1, 2006
INVENTOR(S) : Atsushi Watanabe et al.

It is certified that error appears in the above-identified patent and that said Letters Patent is hereby corrected as shown below:

Column 5, Line 30, change "worpieces" to --workpieces--.
Column 6, Line 16, change "angels" to --angles--.
Column 6, Line 50, after "piece" change "is" to --in--.
Column 6, Line 58, change "Y" to -- Y-, --.
Column 7, Line 52, change "There-dimensional" to --Three-dimensional--.
Column 10, Line 16, change "senor" to --sensor--.

This certificate supersedes the Certificate of Correction issued September 18, 2007.

Signed and Sealed this

Twenty-ninth Day of July, 2008

JON W. DUDAS
*Director of the United States Patent and Trademark Office*